United States Patent
Greenbaum et al.

(10) Patent No.: US 11,938,960 B1
(45) Date of Patent: Mar. 26, 2024

(54) SYSTEMS AND METHODS FOR CONTROLLING VEHICLES WITH NAVIGATION MARKERS

(71) Applicant: Amazon Technologies, Inc., Seattle, WA (US)

(72) Inventors: Adam Joseph Greenbaum, Boston, MA (US); Yvetta Pols Sandhu, Winchester, MA (US); Gregory Cartagena, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 17/373,360

(22) Filed: Jul. 12, 2021

(51) Int. Cl.
*B60W 60/00* (2020.01)
*B60W 50/00* (2006.01)
*B60W 50/14* (2020.01)
*G01C 21/20* (2006.01)
*G01J 1/04* (2006.01)
*G01J 1/42* (2006.01)
(Continued)

(52) U.S. Cl.
CPC .......... *B60W 60/001* (2020.02); *B60W 50/00* (2013.01); *B60W 50/14* (2013.01); *G01C 21/206* (2013.01); *G01J 1/0488* (2013.01); *G01J 1/429* (2013.01); *G06F 16/25* (2019.01); *G06F 16/28* (2019.01); *B60W 2050/0003* (2013.01); *B60W 2050/0004* (2013.01); *B60W 2050/146* (2013.01); *B60W 2420/42* (2013.01); *B60W 2720/10* (2013.01); *B60W 2720/12* (2013.01)

(58) Field of Classification Search
CPC ................. B60W 50/00; B60W 50/14; B60W 2050/0003; B60W 2050/0004; B60W 2050/0047; B60W 2050/143; B60W 2050/146; B60W 60/001; B60W 60/00256; B60W 2420/40; B60W 2420/42; B60W 2552/53; B60W 2720/10; B60W 2720/12; G01C 21/206; G06F 16/25; G06F 16/28; G01J 1/0488; G01J 1/429
See application file for complete search history.

(56) References Cited

U.S. PATENT DOCUMENTS

| | | | | |
|---|---|---|---|---|
| 5,204,814 A | * | 4/1993 | Noonan | G05D 1/0265 701/25 |
| 11,104,279 B2 | * | 8/2021 | Solar | B60R 1/00 |
| 11,199,413 B2 | * | 12/2021 | Weissman | G01S 17/06 |

(Continued)

*Primary Examiner* — Russell Frejd
*Assistant Examiner* — Brandon Z Willis
(74) *Attorney, Agent, or Firm* — Eversheds Sutherland (US) LLP

(57) ABSTRACT

Systems, methods, and computer-readable media are disclosed for controlling one or more vehicles with the use of navigation markers positioned or integrated into a ground surface. A vehicle, such as an autonomous vehicle, may include a light detection assembly, which may include a light emitter, an optical filter, an optical sensor, and an analog-to-digital converter, and optionally may include a lens. The light emitter may emit light towards the ground surface which may illuminate the navigation marker and cause the navigation marker to emit light passes through the optical filter and is ultimately sensed by the optical sensor. The vehicle may determine the light was emitted by the navigation marker and cause the vehicle to perform the predetermined action.

18 Claims, 9 Drawing Sheets

(51) Int. Cl.
*G06F 16/25* (2019.01)
*G06F 16/28* (2019.01)

(56) References Cited

U.S. PATENT DOCUMENTS

| | | | |
|---|---|---|---|
| 2019/0080612 A1* | 3/2019 | Weissman | G01S 19/42 |
| 2019/0120967 A1* | 4/2019 | Smits | G01C 21/3626 |
| 2020/0401158 A1* | 12/2020 | Kitano | G06T 7/73 |
| 2023/0089742 A1* | 3/2023 | Sun | G06V 10/40 |
| | | | 701/55 |

\* cited by examiner

SYSTEMS AND METHODS FOR CONTROLLING VEHICLES WITH NAVIGATION MARKERS

BACKGROUND

As e-commerce continues to grow, distribution centers and warehouses housing various products and goods have become larger and more and more complex. To meet the growing demand for delivering such products and goods, autonomous vehicles have been employed. For example, autonomous vehicles may be used to transport goods from one area of a distribution center to another area of a distribution center and/or may be used for a variety of different purposes, such as sorting items. To maintain order and facilitate a safe environment, distribution facilities often require that vehicles drive along designated paths and even at designated speeds. While advances in autonomous vehicle technology have improved safety and reliability of such vehicles, it may be difficult to cause such vehicles to follow the navigation rules of the distribution center including rules about maximum speed, designated pathways, and other navigation related rules.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods herein may be used to emit light from a vehicle and detect light of various wavelengths to inform a vehicle of one or more actions to take. An autonomous vehicle may be designed to navigate an environment such as a distribution center, warehouse, storage facility, for example, and may have one or more light emitters (e.g., a light emitting diode (LED)) and may have an optical sensor to detect light and an optical filter to block unwanted light. Based on the light detected, which may be light emitted off of a navigation marker, the autonomous vehicle may take one or more actions such as decreasing speed, increasing speed, stopping, presenting visual and/or audio information, sending a wireless message, or any other action.

The light emitter may be positioned on or near the bottom of an autonomous vehicle and may be oriented towards the ground. The environment in which the autonomous vehicle navigates may include navigation markers intended to emit light upwards towards the autonomous vehicle through a fluorescent emission. When the emitted light from the light emitter (e.g., the excitation illumination) strikes a navigation marker, a known emission wavelength may result. For example, the emitted light may be expected to be in the fluorescence spectrum or within a band of that spectrum.

In addition to the excitation illumination source, the autonomous vehicle may include an optical sensor near the excitation source (e.g., on or near the bottom of an autonomous vehicle) that may detect emitted light from the navigation marker. To reduce noise and accurately detect the emitted light, the optical sensor may be aligned with an optical filter and/or a lens. The optical sensor may generate a signal based on the detected fluorescent signal. If the signal corresponds to a navigation marker, the autonomous vehicle may perform an action associated with that signal.

Figure 1:
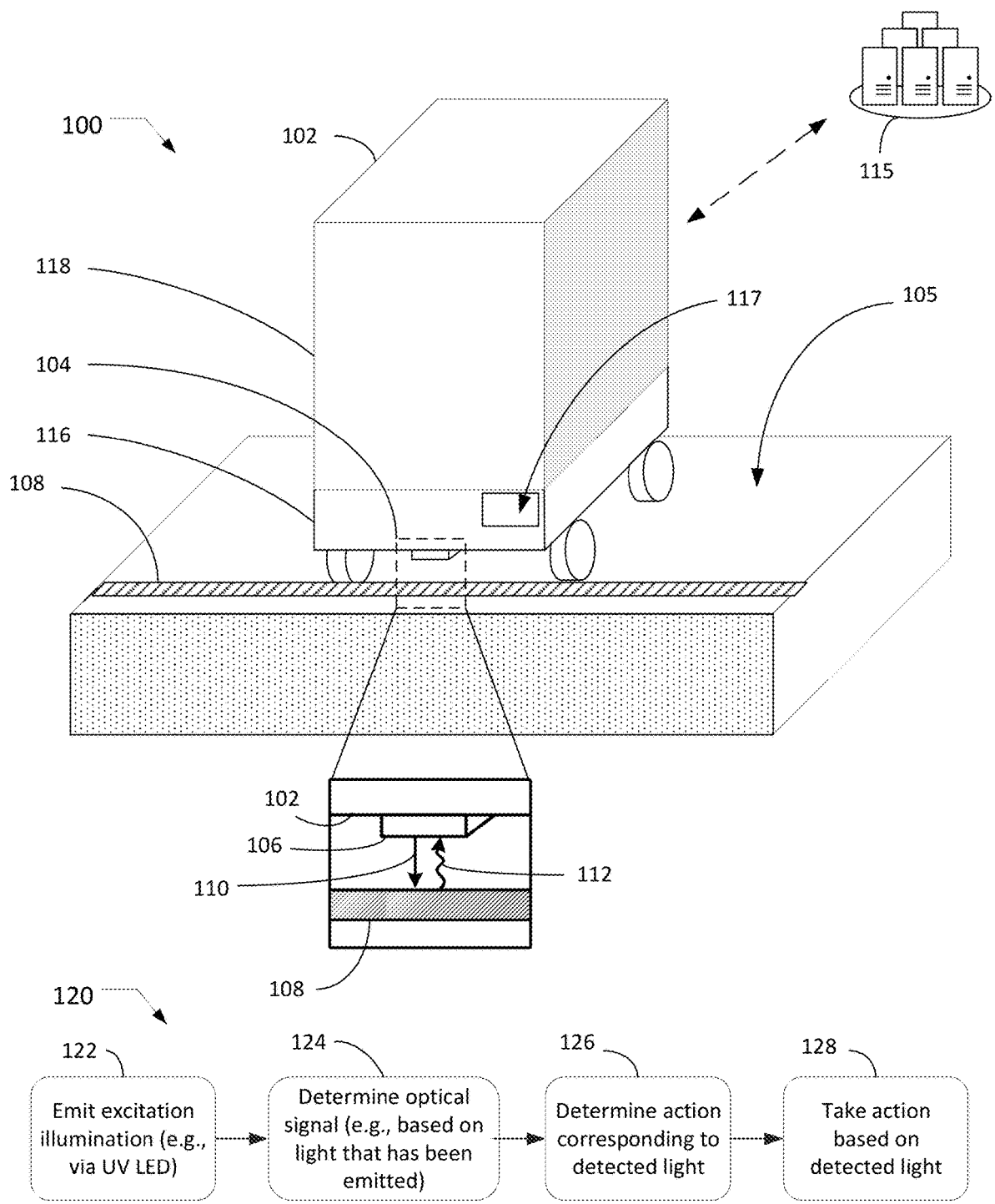
FIG. 1 is a schematic illustration of an example use case for employing a light detection assembly on a vehicle, in accordance with one or more example embodiments of the present disclosure.

Referring to FIG. 1, an example use case 100 for causing a vehicle to perform an action using a navigation marker is illustrated in accordance with one or more example embodiments of the disclosure. For example, in the illustrated example, vehicle 102, which may be an autonomous vehicle, may include one or more computing device 117 and/or may comminute wirelessly with one or more computing device 115, which may be one or more computing devices and/or servers. Vehicle 102 may include a powered component 116 which may include one or more propulsion systems (e.g., electric engine with wheels) and/or may include one or more storage compartments 118, which may house or store items, products, payloads, packages, and the like.

Figure 2A:
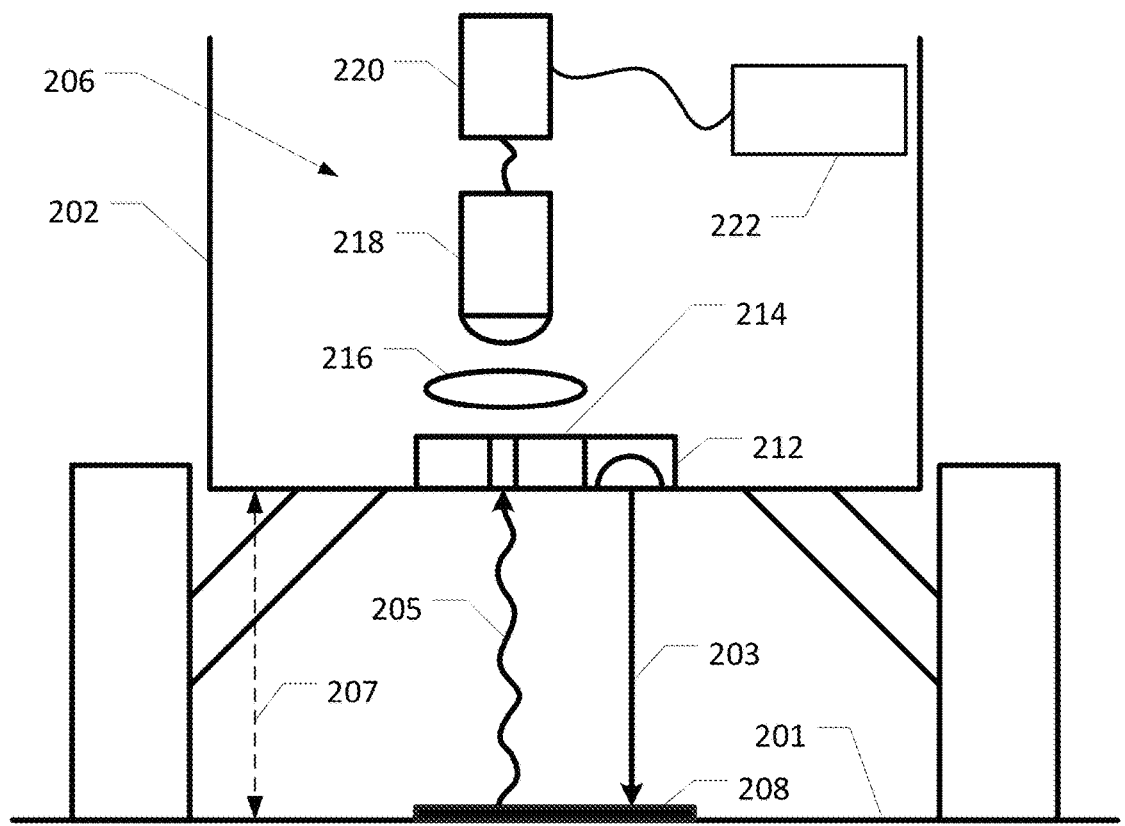
FIGS. 2A-2B are schematic illustrations of light detection assemblies, in accordance with one or more example embodiments of the present disclosure.
Figure 2B:
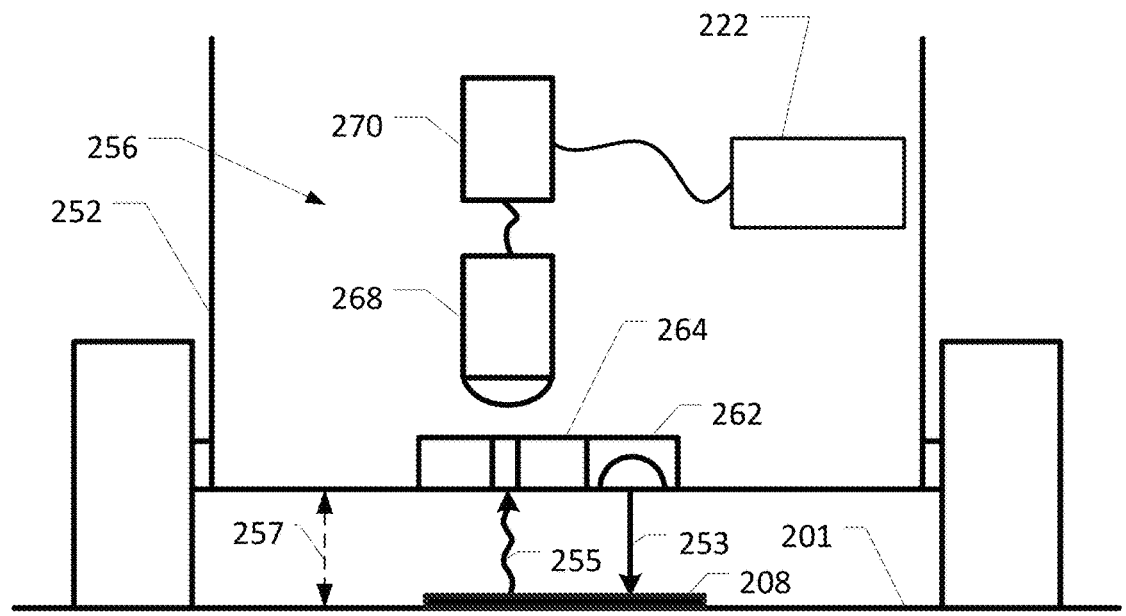

Vehicle 102 may further include light detection assembly 106 which may be in communication with computing device 117 and/or computing device 115. Light detection assembly 106 may include a light emitter, an optical sensor, an optical filter, a lens and/or an analog-to-digital converter. Exemplary light detection systems are illustrated in FIGS. 2A and 2B. As shown in FIG. 1, light detection assembly 106 may be in communication with navigation marker 108. Together, light detection assembly 106 and navigation marker 108 may form navigation system 104.

Navigation marker 108 may be any type of structure designed to fluoresce in the spectrum of interest. For example, navigation marker may receive excitation illumination and in response may emit a certain wavelength light, such as a visible wavelength. The emitted wavelength may be determined by material and/or optical properties of the navigation marker. For example, the navigation marker 108 may be designed to always emit a specific wavelength when illuminated by a certain emitted wavelength. Emitted wavelengths, when absorbed by the navigation marker, cause emission of known wavelengths. In this manner, a navigation system may be designed to emit one or more wavelengths known to cause the navigation marker to fluoresce based on the material and/or optical properties of the navigation marker.

The navigation markers 108 may be made from any type of material having material and/or optical properties that may be designed to be illuminated by a certain wavelength and emit a different wavelength (e.g., a visible wavelength). For example, navigational markers may be taped with an emissive side and an adhesive side, one or more plastic or similar material markers that may be affixed to a ground surface, concrete or other similar hard surfaces, paint, and/or other similar materials having desirable optical properties. In one example, navigation marker 108 may be a fluorescing paint or tape that may emit a certain wavelength when illuminated by an excitation source with a particular wavelength. For example, the excitation source may be in the ultra violet (UV) spectrum and the light emitted or reflected from the navigation marker 108 may be in the visible spectrum.

The navigation markers 108 may be strategically distributed about a warehouse, store facility, distribution center or any other facility in which autonomous vehicles may navigate. For example, navigation markers may be used to mark boundaries of areas for which vehicle 102 must remain within. Alternatively, or in addition, navigation markers 108 may designate a maximum speed in certain areas of a facility or may cause vehicles to stop or even present a visual alarm (e.g., a flashing light siren) or an audible alarm (e.g., an alarm noise). However, it is understood that the light emitted from the navigation marker may be a signal that may cause the vehicle to perform any action that is associated with the emitted light (e.g., the wavelength of the emitted light). In one example, the action may be to transmit a predetermined message.

Computing device 117 and/or computing device 115 may be any computing device in communication with light detection assembly 106 that may also communicate with each other and/or one or more servers and/or other computing devices via any well-known wired or wireless system (e.g., Wi-Fi, cellular network, Bluetooth, Bluetooth Low Energy (BLE), near field communication protocol, etc.). Computing device 115 and/or computing device 117 may be any computing device with a processor. Computing device 115 may be laptop, desktop computer, server, or even a smart phone, tablet, wearable device, or the like. Computing device 117 and/or computing device 115 may run one or more local applications to facilitate operation of the light detection assembly 106 and computing device 117 and/or 115, and/or any other computing devices or servers may otherwise process instructions and/or perform operations or tasks described herein.

The local application may be one or more applications or modules run on and/or accessed by computing device 117 and/or 115. In one example, a local application runs on computing device 117 and may locally perform one or more of the operations or tasks described herein. Alternatively, computing device 117 may communicate optical data received from light detection assembly 106 to computing device 115 and computing device 115 may perform one or more of the operations and tasks described herein.

To initiate the actions of employing the navigation system 104, an example process flow 120 is presented and may be performed, for example, by one or more modules at computing device 117 and/or computing device 115. For example, the computing device 117 and/or computing device 115 may include at least one memory that stores computer-executable instructions and at least one processor configured to access the at least one memory and execute the computer-executable instructions to perform various actions or operations, such as one or more of the operations in the process flow 120 of FIG. 1.

At block 122, light detection assembly 106 may emit light (e.g., emitted light 110) in the direction of ground surface 105, which may be concrete, for example. In one example, light detection assembly 106 may emit ultra violet (UV) light toward the ground surface 105. As vehicle traverses navigation marker 108, emitted light 110 may illuminate navigation marker 108. As shown in FIG. 1, navigation marker may then emit fluorescent light 112 in a substantially opposite direction (e.g., upward) toward vehicle 102. Detected light 112 will be different from emitted light 110 based on the material and/or optical properties of navigation marker 108.

At block 124, light detection assembly 106 may determine an optical signal based on light that has been emitted from the navigation marker. For example, light detection assembly 106 may include an optical sensor such as a photodiode that may generate signal based on the detected light 112. Based on the signal, or a digital representation thereof, the computing device 117 and/or computing device 115 may determine certain optical properties such as an intensity value.

At block 126, computing device 117 and/or computing device 115 may determine that the signal or digital representation corresponds to a vehicle action (e.g., an intensity value may satisfy a threshold value). Computing device 117 and/or computing device 115 may maintain a database of actions for associated emitted light 110 and detected light 112 that are associated with certain navigation markers. For example, a certain navigation marker, upon illumination with an excitation source 110 emits fluorescent light 112 having a specific wavelength or optical property that may correspond to an action of reducing speed to 5 m.p.h. or even stopping immediately.

At block 128, computing device 117 and/or computing device 115 may determine to perform an action based on the action determined at block 126. In one example, computing device computing device 117 and/or computing device 115 may then immediately cause vehicle 102 to perform that action (e.g., stop, decrease speed, increase speed, sound alarm, initiate flashing light, send transmission, etc.). In another example, a navigation module may be responsible for controlling vehicle 102 and may use the determined actions at block 126 as one of many inputs to determine how to control vehicle 102.

Illustrative Process and Use Cases

FIGS. 2A-2B depicts schematic diagrams of a vehicle including light detection assemblies with and without a lens, in accordance with one or more example embodiments of the disclosure.

As shown in FIG. 2A, vehicle 202 may be similar to vehicle 102 and may include light detection assembly 206, similar to light detection assembly 106. Vehicle 202 may have a relatively large distance between a bottom surface of vehicle 202 and ground surface 201. For example, distance 207 may be desirable for the vehicle to avoid obstructions on ground surface 201. Ground surface 201 may further include navigation marker 208. Navigation marker 208 may be the same as navigation marker 108. For example, navigation marker 208 may be a fluorescing tape having known optical properties.

Light detection assembly 206 may include light emitter 212, optical filter 214, lens 216, optical sensor 218 and analog-to-digital converter 220. As shown in FIG. 2A, optical filter 214 may be close in proximity to light emitter 212. Light emitter 212 may be any light emitting device that is designed to emit light at a specific wavelength or range of wavelengths, such that the light being emitted has a known wavelength or range of wavelengths. In one example, the light emitting device may be an ultra violet (UV) light emitting diode (LED), however it is understood that any well-known light emitting device may be used. It is further understood that more than one light emitter 212 may be employed. As shown in FIG. 2A, light emitter may be oriented downward and may emit emitted light 203.

Optical filter 214 may be any type of optical filter designed to filter certain wavelengths of light. In one example, optical filter 214 may be a narrow band optical filter. Optical filter 214 may permit only a certain wavelength or range of wavelengths to traverse the optical filter, thereby targeting a wavelength or range of wavelengths of interest. It is understood that optical filter 214 may include one or more coating or dopant and further that one or more optical filters may be employed 214. As shown in FIG. 2A, emitted light 203 may illuminate navigation marker 208 which may emit detected light 205, which may be received and/or filtered by optical filter 214.

As the wavelength of the emitted light is known, and the optical properties of navigation marker 208 are known, the optical filter 214 may be selected and/or designed based upon the expected detected light 205 based on the navigation marker and the emitted light 203. For example, if the emitted light 203 is known to induce fluorescence of navigation marker 208 in specific wavelengths, the optical filter 214 may be designed to only permit light in the fluorescence wavelengths to propagate through the filter. This may reduce noise and improve accuracy of the light detection assembly 206. Optical filter 214 may be designed to eliminate wavelengths of light in an environment (lighting).

Optical filter 214 may be aligned with an optional lens 216. Lens 216 may focus the detected light 205 before or after it traverses optical filter 214. Lens 216 may be employed when the bottom surface of vehicle 202 is significantly offset from the ground surface 201 or even when the optical sensor 218 is close to the ground, as detected light 205 may need to be focused at such distances to accurately analyze such detected light 205. Optical sensor 218 may be aligned with lens 216 such that optical sensor 218 may detect the light that passes through optical filter 214 and is focused by lens 216.

Optical sensor 218 may be any well-known optical sensor designed to generate an electrical signal based on the light detected by the optical sensor. In one example, optical sensor 218 may be photodiode. It is understood that more than one optical sensor 218 may be employed. Optical sensor 218 may be designed and/or selected for sensitivity in an expected range of wavelengths for detected light 205 based on the wavelength of emitted light 203 and the optical properties of navigation marker 208.

To convert the signal generated by optical sensor 218 to a digital signal, optical sensor 218 may be in electrical communication with analog-to-digital converter 220, which may be any well-known analog-to-digital converter. It is understood that analog-to-digital converter 220 and optical sensor 218 may, optionally, be the same device. It is further understood that analog-to-digital converter 220 may be in electrical communication with computing device 222. Computing device 222 may be the same as computing device 117 in FIG. 1.

Referring now to FIG. 2B, vehicle 252 is illustrated. Vehicle 252 may be similar to vehicle 102 and may include light detection assembly 256. Vehicle 252 may have a relatively smaller distance 257 between a bottom surface of vehicle 252 and ground surface 201, as compared to distance 207 of FIG. 2A. In certain circumstances, it may be desirable for the bottom surface of vehicle 256 to be relatively close to ground surface 201 (e.g., to maintain a low center of gravity of vehicle 252 to avoid overturning, or to eliminate external illumination from reaching the light detection assembly 256). Vehicle 256 may further include computing device 222.

Light detection assembly 256 may include light emitter 262, optical filter 264, optical sensor 268 and analog-to-digital converter 270. Light emitter 262 may be the same as or similar to light emitter 212 and thus may be any light emitting device (e.g., ultra violet (UV) light emitting diode (LED)). As shown in FIG. 2B, optical filter 264 may be close in proximity to light emitter 262. Optical filter 264 may be the same or similar to optical filter 214. Optical filter 264 may be aligned with optical sensor 268, which may be the same as or similar to optical sensor 218.

As the distance between navigation marker 208 and light detection assembly 256 is relatively close, as compared to distance 207 in FIG. 2A, a lens (e.g., lens 216 of FIG. 2A) may not be needed to focus light received by optical sensor 268. For example, the emitted light 253 from light emitter 262 may illuminate navigation marker 208 and cause navigation marker 208 to emit detected light 255 towards optical filter 264 and optical sensor 268. As distance 257 is relatively small, a lens may not be required to focus detected light 255. Optical sensor 268 may be in communication with analog-to-digital converter 270 which may be the same as or similar to analog-to-digital converter 220. Computing device 222 may perform the same operations and functions as the computing device 222 described above with respect to FIG. 2A.

Figure 3A:
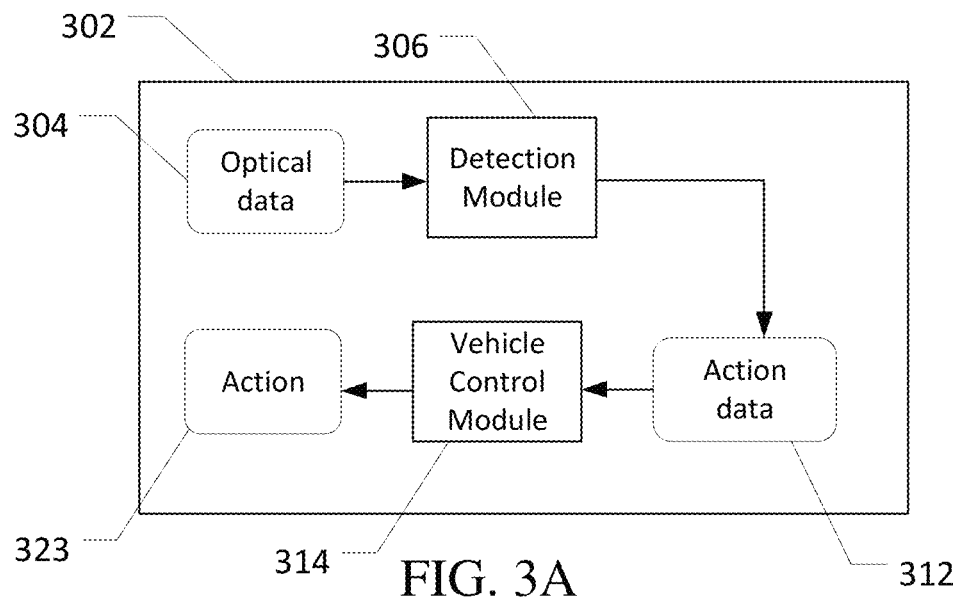
FIGS. 3A-3B are exemplary data flows for determining an action for controlling a vehicle, in accordance with one or more example embodiments of the present disclosure.
Figure 3B:
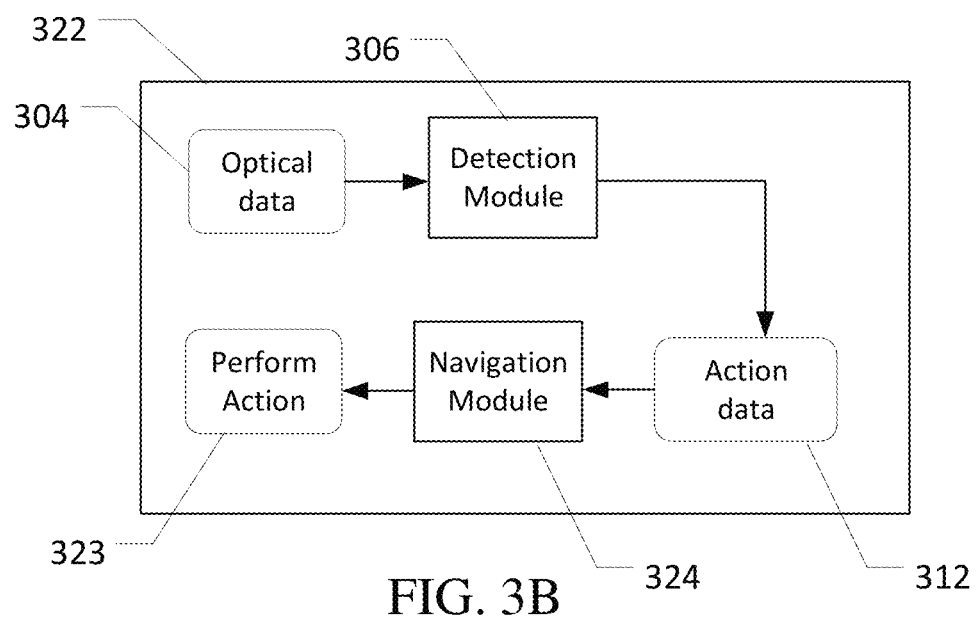

Referring now to FIGS. 3A-3B, schematic block diagrams of data flows for determining an action to take on a vehicle based on a light signal is depicted, in accordance with one or more example embodiments of the disclosure. Some or all of the blocks of the data flows in this disclosure may be performed in a distributed manner across any number of devices (e.g., computing devices and/or servers). Some or all of the operations of the process flow may be optional and may be performed in a different order.

As shown in FIG. 3A, computing device 302 may determine and/or receive optical data 304 which may correspond to an analog and/or raw signal generated by an optical sensor. The optical data 304 may be indicative of light emitted from a navigation marker. The optical data may include optical properties such as an intensity value. Upon receiving the optical data 304, the optical data 304 may be analyzed by detection module 306 to determine if the optical data 304 was emitted by a navigation marker. For example, the intensity value may be compared against a threshold value.

If the optical data 304 is determined to have been emitted from a navigation marker (e.g., the threshold value is satisfied), actions instructions may be determined. Action data 312 may indicate an action to be performed by the vehicle. For example, the action data 312 may cause the vehicle to increase speed, decrease speed, stop, transmit a message, and/or present audio and/or visual information (e.g., alarms). Action data 312 may be analyzed by a vehicle control module 314, which may be responsible for controlling the vehicle. The vehicle control module may then perform action 323 based on action data 312.

Referring now to FIG. 3B, computing device 322 may be similar to computing device 302 and may receive optical data 304 which may be analyzed by detection module 306. Detection module 306 may determine action data 312 which may be communicated to navigation module 314. Navigation module 324 may be responsible for autonomous navigation of the vehicle and thus may make navigation decisions based on input from various sensors on the vehicle. Action data 312 may be one of several inputs analyzed by navigation module 324 and based on this input, along with other input analyzed by navigation module 324, the vehicle may or may not perform the action 323 based on action data 312.

Figure 4:
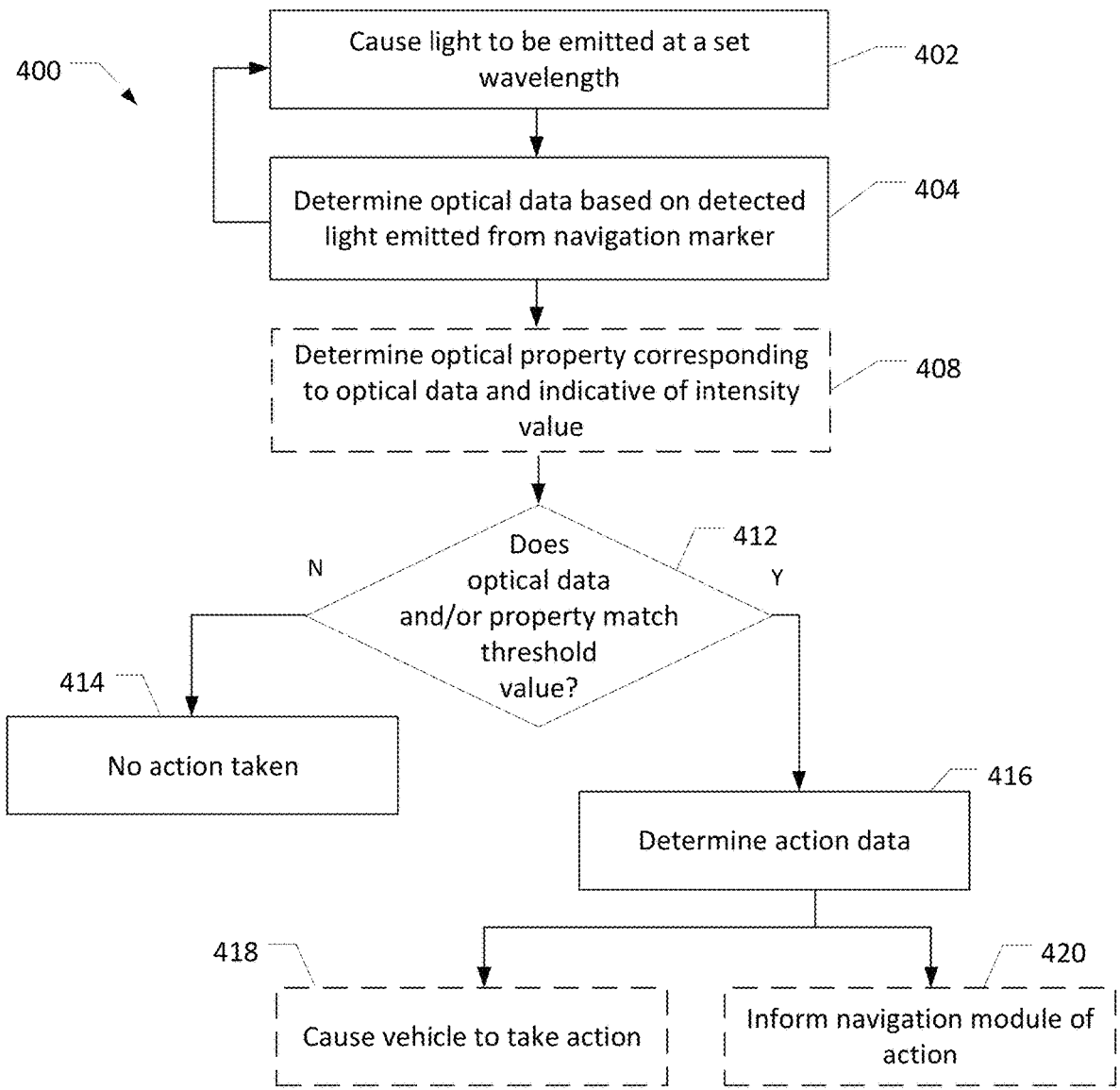
FIG. 4 is a schematic illustration of a data flow for determining an optical signal and determining an action to take on the vehicle, in accordance with one or more example embodiments of the present disclosure.

Referring now to FIG. 4, example process flow 400 is depicted for determining an action to perform on the vehicle based on optical data, in accordance with one or more example embodiments of the disclosure. Some or all of the blocks of the process flows in this disclosure may be performed in a distributed manner across any number of devices (e.g., computing devices and/or servers). Some or all of the operations of the process flow may be optional and may be performed in a different order.

To employ process flow 400, at block 402 computer-executable instructions stored on a memory of a device, such as a computing device, may be executed to cause light to be emitted from a light emitter. At block 404, computer-executable instructions stored on a memory of a device, such as a computing device, may be executed to determine optical data based on detected light using an optical sensor and an analog-to-digital converter and determine optical data corresponding to the detected light. The light detected may be light emitted from a navigation marker illuminated by the excitation source. After step 404, step 402 may be reinitiated.

At optional block 408, computer-executable instructions stored on a memory of a device, such as a computing device, may be executed to determine one or more optical properties corresponding to the optical data (e.g., intensity value). At decision 412, computer-executable instructions stored on a memory of a device, such as a computing device, may be executed to determine if the optical data and/or optical property satisfy a threshold value (e.g., does the intensity value meet or exceed a threshold value.

At block 414, if the optical data and/or optical property does not satisfy the threshold value, computer-executable instructions stored on a memory of a device, such as a computing device, may be executed to determine that no action should be taken. Alternatively, if the optical data and/or optical property satisfied the threshold value, at block 416 computer-executable instructions stored on a memory of a device, such as a computing device, may be executed to determine the corresponding action data.

At optional block 418, computer-executable instructions stored on a memory of a device, such as a computing device, may be executed to cause the vehicle to take the action based on the action data. Alternatively, at optional block 420, computer-executable instructions stored on a memory of a device, such as a computing device, may be executed to inform the navigation module of the action. The navigation module may then take that action based on the action data.

Figure 5:
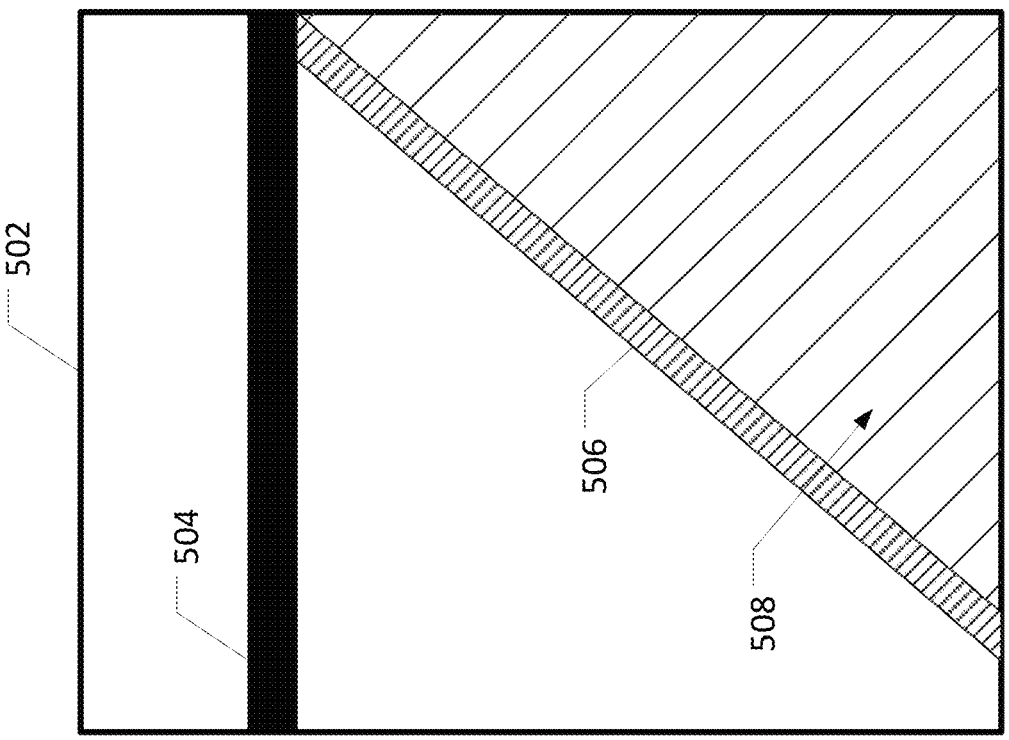
FIG. 5 is a schematic illustration of vehicle marking arrangement, in accordance with one or more example embodiments of the present disclosure

Referring now to FIG. 5, an exemplary arrangement of navigation markings is illustrated, in accordance with one or more example embodiments of the disclosure. As shown in FIG. 5, ground surface 502 may be a ground surface in an environment where autonomous vehicles navigate. For example, ground surface 502 may be located in a warehouse, distribution center, storage facility or the like. Ground surface 502 may include several navigation markings such as navigation marker 504, navigation marker 506, and navigation marker 508. It is understood that navigation marker 504, navigation marker 506, and navigation marker 508 may each be the same or similar to navigation marker 108 described above with respect to FIG. 1, and may each have different optical properties.

In the example illustrated in FIG. 5, navigation marker 504 may include optical properties that when illuminated by an excitation source of a vehicle emits a wavelength that is known to the vehicle to correspond to the action of stopping the vehicle immediately. Accordingly, when light detection system of a vehicle detects navigation marker 504, the vehicle stops immediately. Navigation marker 506 may include optical properties that, when illuminated by an excitation source of a vehicle, emits a wavelength that is known to the vehicle to correspond to the action of reducing the speed of the vehicle. Accordingly, when light detection system of a vehicle detects navigation marker 506, the vehicle reduces its speed immediately. Finally, navigation marker 508 may include optical properties that, when illuminated by a light emitter of a vehicle, emits a wavelength that is known to the vehicle to correspond to the action of causing the vehicle to sound an alarm on a speaker. Accordingly, when light detection system of a vehicle detects navigation marker 508, the vehicle sounds an alarm.

Figure 6:
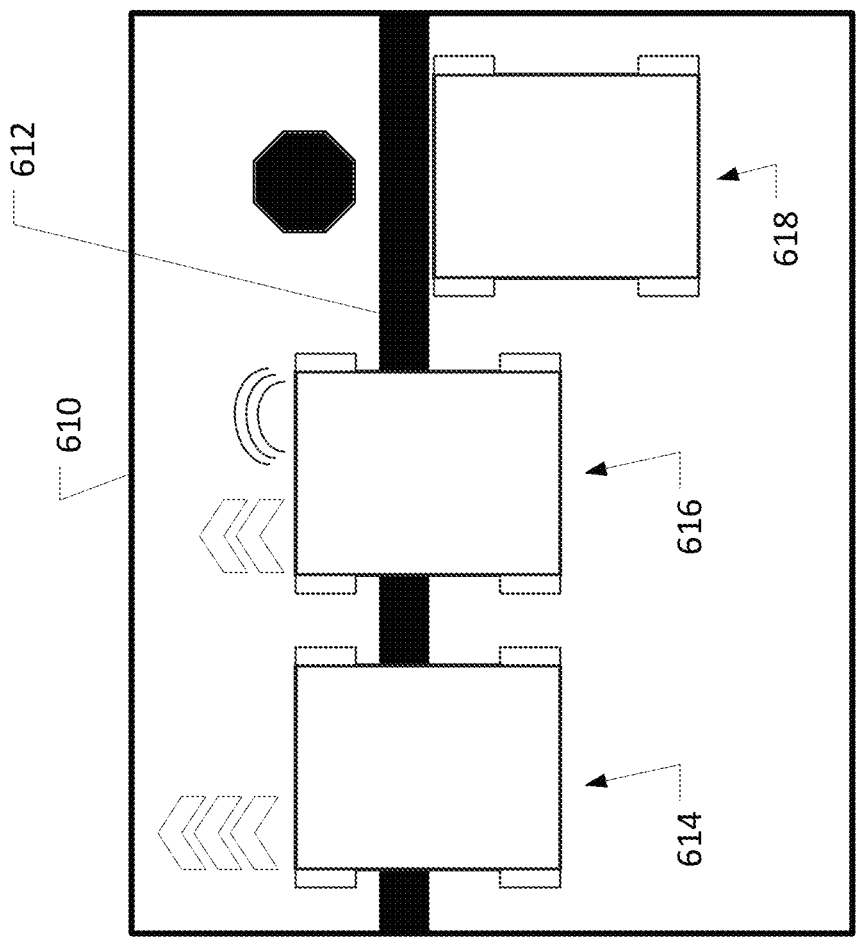
FIG. 6 is a schematic illustration of vehicle marking and different vehicle actions, in accordance with one or more example embodiments of the present disclosure.

Referring now to FIG. 6, an exemplary ground surface and navigation marker is illustrated, in accordance with one or more example embodiments of the disclosure. As shown in FIG. 6, vehicle 614, vehicle 616 and vehicle 618 may navigate ground surface 610 and may traverse and/or approach navigation marker 612, which may be the same or similar to navigation marker 108 described above with respect to FIG. 1. While navigation marker 612 may have a consistent optical property throughout, it may cause different vehicles to perform different actions. For example, vehicle 614 may increase speed based on navigation marker 612, vehicle 616 may increase speed to a lesser extent and may also sound an alarm based on navigation marker 612, and vehicle 618 may stop immediately based on navigation marker 612. It is understood that vehicle 614, vehicle 616 and vehicle 618 may each have a light emitter that generates an emitted light having the same wavelength but may each be programmed to perform different actions based the same light emitted from navigation marker 612.

Figure 7:
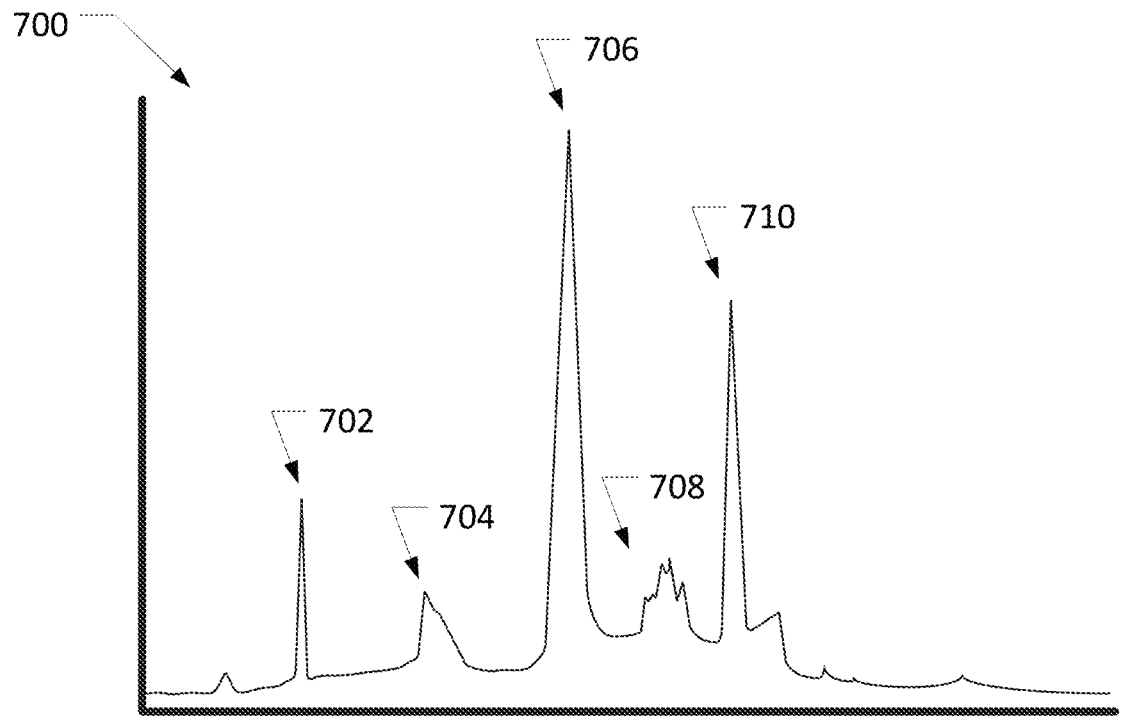
FIG. 7 is a schematic illustration of a fluorescence spectrum and corresponding data points, in accordance with one or more example embodiments of the present disclosure.

Referring now to FIG. 7, an exemplary fluorescent spectrum 700 is illustrated along with a corresponding action database 720, in accordance with one or more example embodiments of the disclosure. The fluorescent spectrum 700 may include various wavelength peaks in the spectrum. For example peak 702 may be labeled peak 1, peak 704 may be labeled peak 2, peak 706 may be labeled peak 3, peak 708 may be labeled peak 4, and peak 710 may be labeled peak 5. Each peak may correspond to a distinct wavelength in the fluorescent spectrum. For each distinct peak, action database 720 may maintain associations with a vehicle and one or more actions. As shown in FIG. 7, for vehicle 1, the wavelength corresponding to peak 3 may be associated with an action, for vehicle 2 the wavelength corresponding to peak 5 may be associated with an action, for vehicle 3 the wavelength corresponding to peak 4 may be associated with an action, and for vehicle 4 the wavelength corresponding to peak 1 may be associated with an action.

Figure 8:
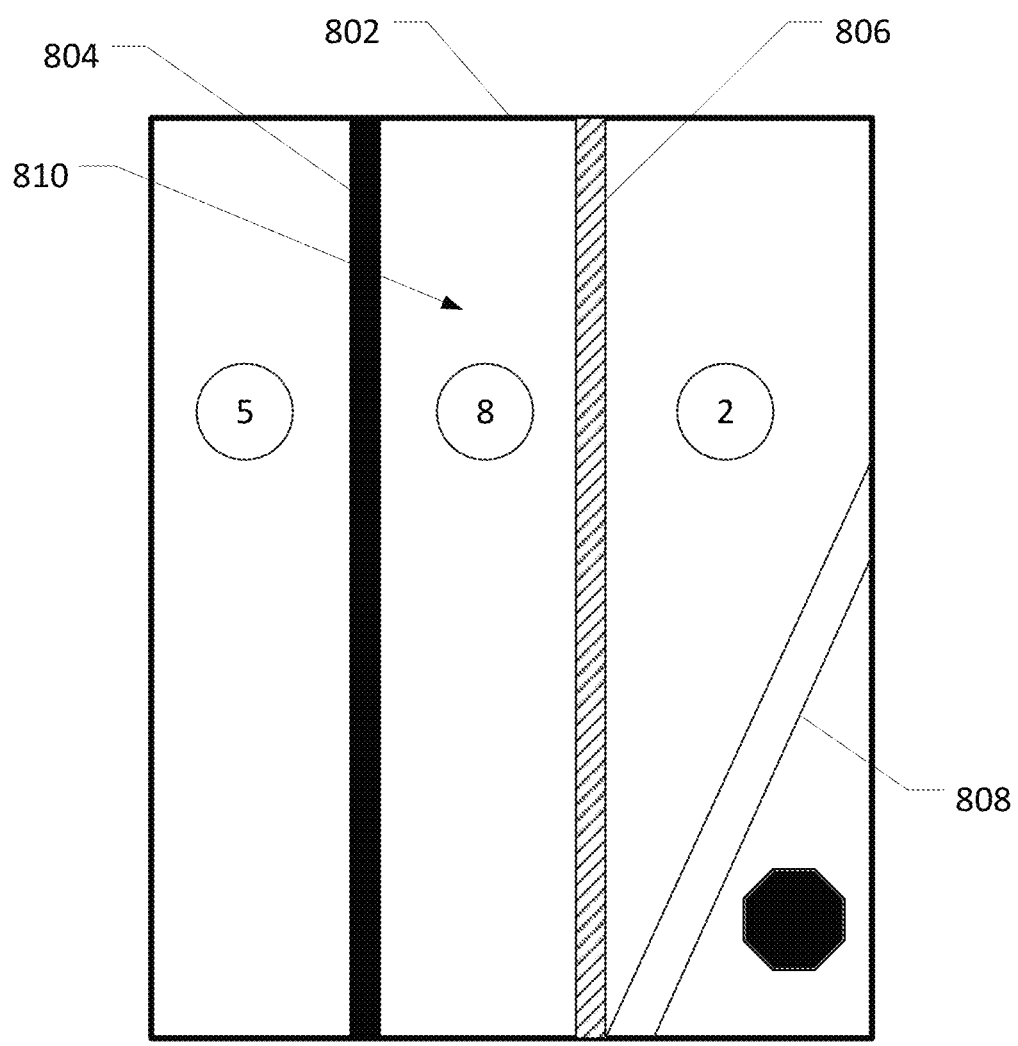
FIG. 8 is a schematic illustration of vehicle marking in navigation of various zones, in accordance with one or more example embodiments of the disclosure.

Referring now to FIG. 8, an exemplary arrangement of navigation markings is illustrated with various navigation pathways, in accordance with one or more example embodiments of the disclosure. As shown in FIG. 8, ground surface 802 may be a ground surface in an environment where autonomous vehicles navigate. The ground surface 802 may include several navigation markings such as navigation marker 804, navigation marker 806, and navigation marker 808, that may define one or more navigation pathways for autonomous vehicles to follow. For example, navigation marker 804 and navigation marker 806 may define pathway 810. Alternatively, a vehicle may be programmed to follow a navigation marking.

It is understood that navigation marker 804, navigation marker 806, and navigation marker 808 may each be the same or similar to navigation marker 108 described above, but with different optical properties. For example, when illuminated by an emitted light with a certain wavelength, each of navigation marker 804, navigation marker 806, and navigation marker 808 may emit light of different wavelengths. In this manner navigation marker 804 may correspond to maximum speed of 5 m.p.h, navigation marker 806 may correspond to a maximum speed of 8 m.p.h. and navigation marker 806 may correspond to a maximum speed of 2 m.p.h. Further, navigation marker 808 may correspond to a command to immediately stop.

Figure 9:
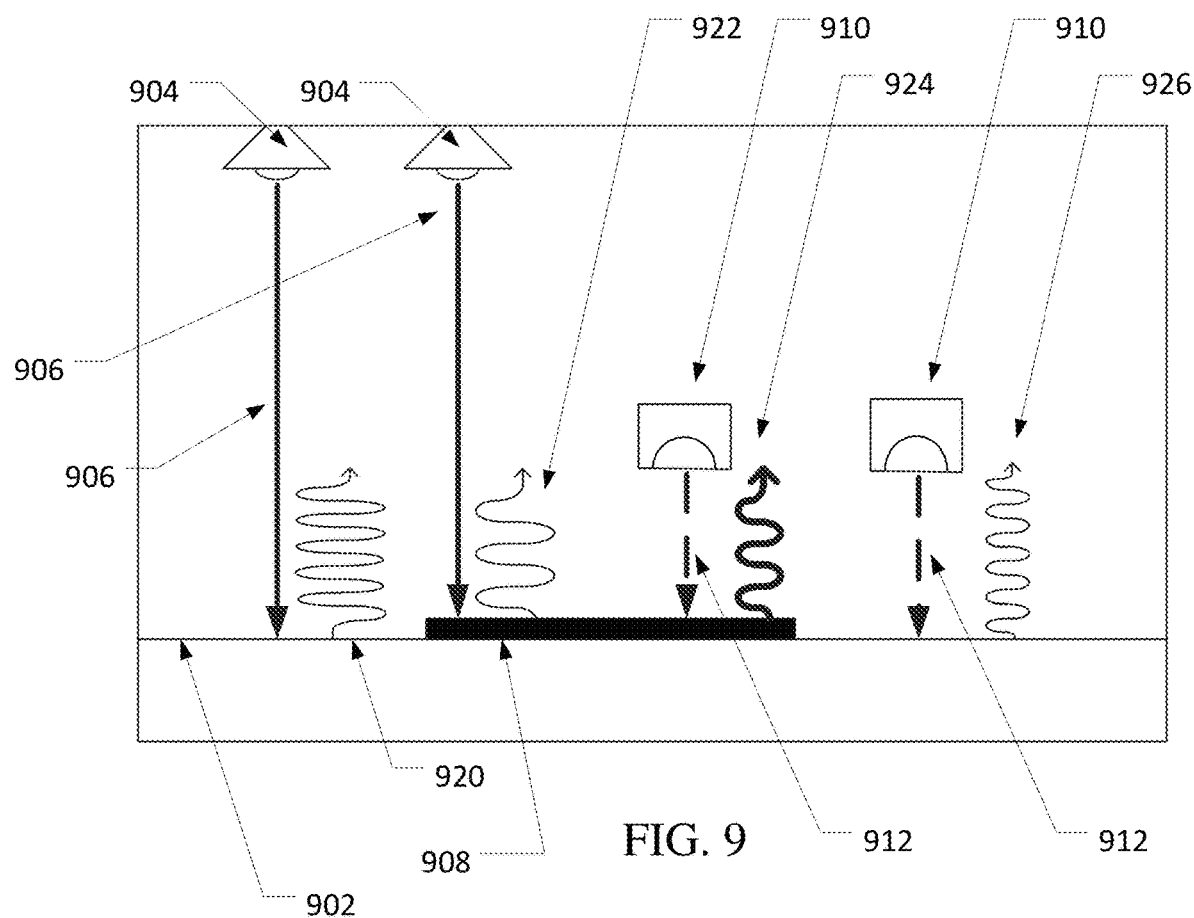
FIG. 9 is a schematic illustration of emitted light and corresponding reflected and emitted light, in accordance with one or more example embodiments of the disclosure.

Referring now to FIG. 9, exemplary emitted light and corresponding reflected light and emitted light from the navigation marker is illustrated, in accordance with one or more example embodiments of the disclosure. As shown in FIG. 9, overhead lighting 904 (e.g., fluorescent lighting) may emit emitted light 906, which may either reflect off ground surface 902 or may reflect off navigation marker 908, which may be the same as navigation marker 108 as described above with respect to FIG. 1. Further, light emitter 910 (e.g., UV diode), which may be part of a light detection system of a vehicle, may emit emitted light 912, which may either reflect off ground surface 902 or emit from navigation marker 908.

As shown in FIG. 9, four different wavelengths may be generated from the overhead lighting 904 and light emitter 910, collectively. Specifically, the overhead lighting 904 may generate reflected light 920, when the emitted light 906 reflects off of ground surface 902 and reflected light 922 when the emitted light 906 reflects off of navigation marker 908. Similarly, light emitter 910 may generate reflected light 926 when reflected off of ground surface 902 and detectable light 924, when reflected off of navigation marker 908. As is shown in FIG. 9, each reflected wavelength of reflected light 920, reflected light 922, detectable light 924, and reflected light 926 are different, which permits the light detection assembly to identify the detectable light that was emitted from the light emitter 910 and subsequently modified and/or emitted by navigation marker 908. Detectable light 924 is distinguishable from reflected light 926, reflected light 922 and reflected light 920 because detectable light 924 corresponds to spectrum including a sharp peak in wavelengths not present for reflected light 926, reflected light 922 and reflected light 920.

Illustrative Device Architecture

Figure 10:
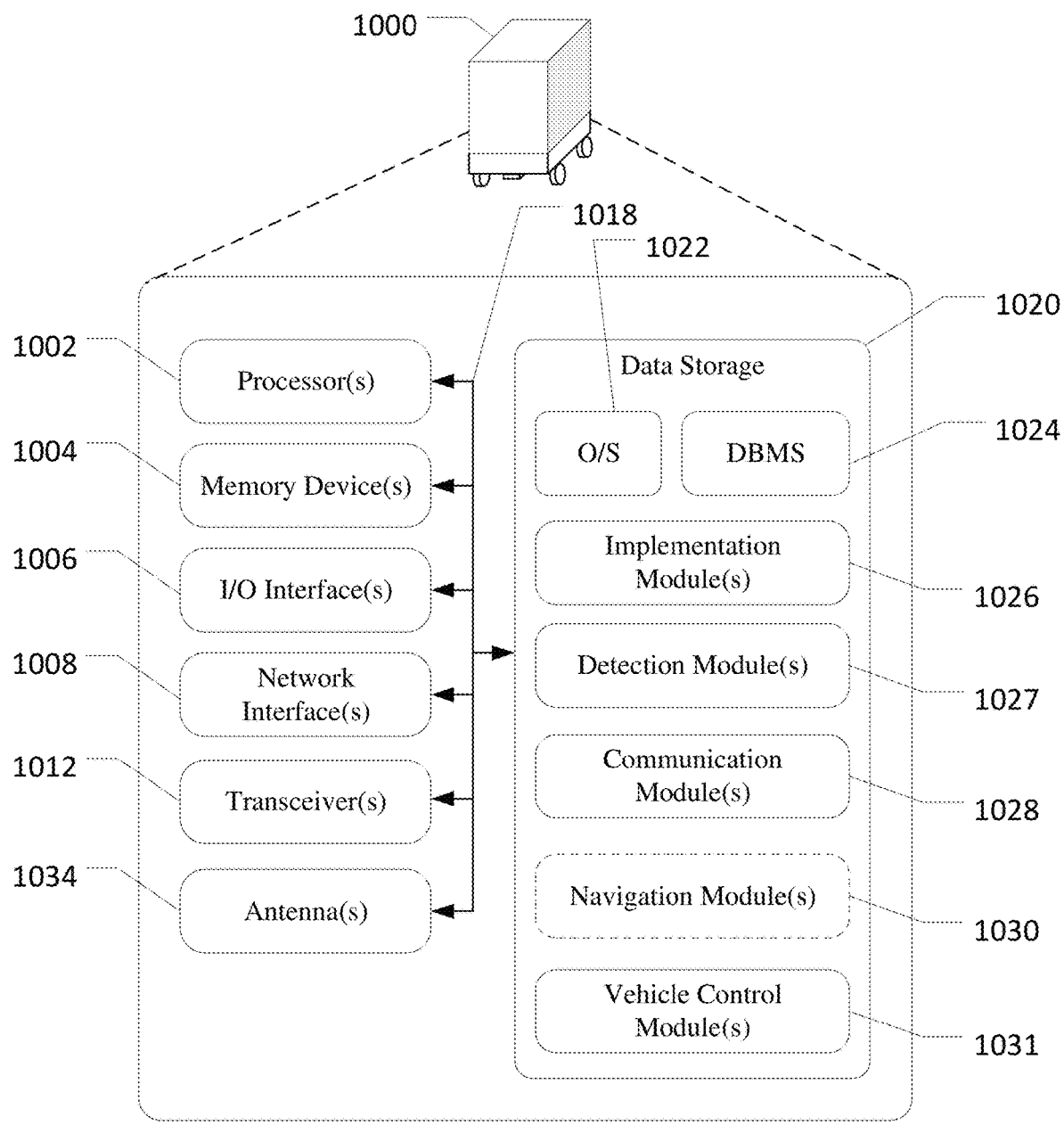
FIG. 10 is a schematic block diagram of a vehicle, in accordance with one or more example embodiments of the disclosure.

FIG. 10 is a schematic block diagram of a vehicle 1000 in accordance with one or more example embodiments of the disclosure. The vehicle 1000 may be an autonomous vehicle and may include a computing device capable of receiving and/or sending data as well as a light emitting assembly including at least a light emitter, an optical filter, an optical sensor, an analog-to-digital converter, and optionally a lens in communication with the computing device. The computing device may be in communication with other computing devices which may optionally perform one or more of the tasks described herein together with the computing device. Vehicle 1000 may correspond to vehicle 102 of FIG. 1 and/or any other vehicle of FIGS. 1-9.

The vehicle 1000 may be configured to communicate via one or more networks with one or more computing devices, servers, electronic devices, vehicles, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the vehicle 1000 may include one or more processors (processor(s)) 1002, one or more memory devices 1004 (generically referred to herein as memory 1004), one or more of the optional input/output (I/O) interface(s) 1006, one or more network interface(s) 1008, one or more transceivers 1012, and one or more antenna(s) 1034. The computing device 1000 may further include one or more buses 1018 that functionally couple various components of the computing device 1000. The computing device 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 1000 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the computing device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more program module(s), applications, engines, computer-executable code, scripts, or the like such as, for example, one or more implementation module(s) 1026, one or more detection module(s) 1027, one or more communication module(s) 1028, one or more optional navigation module(s) 1030, and/or one or more vehicle control module(s) 1031. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the vehicle 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 924 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute computer-executable instructions loaded therein. For example, the processor(s) 1002 may be configured to execute computer-executable instructions of the various program module(s), applications, engines, or the like of the vehicle 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1026 may include computer-executable instructions, code, or the like that are responsive to execution by one or more of the processor(s) 1002 may perform functions including, but not limited to, overseeing coordination and interaction between one or more modules and computer executable instructions in data storage 1020 and/or determining user selected actions and tasks. Implementation module 1026 may further coordinate with communication module 1028 to send messages to and receive messages from a remote computing device.

The detection module(s) 1027 may include computer-executable instructions, code, or the like that responsive to execution by one or more of the processor(s) 1002 may perform functions including, but not limited to, determining optical data corresponding to an optical signal and/or, optionally, determining optical properties based on the optical data. For example, the optical properties may correspond to a wavelength value, an electrical value, a waveform, or any otherwise electrical or optical property.

The communication module(s) 1028 may include computer-executable instructions, code, or the like that responsive to execution by one or more of the processor(s) 902 may perform functions including, but not limited to, communicating with one or more computing devices, for example, via wired or wireless communication, communicating with computing devices, communicating with one or more servers (e.g., remote servers), communicating with remote datastores and/or databases, sending or receiving notifications or commands/directives, communicating with cache memory data, and the like.

The optional navigation module(s) 1030 may include computer-executable instructions, code, or the like that are responsive to execution by one or more of the processor(s) 1002 may perform functions including, but not limited to, determining navigation data (e.g., a navigation path) corresponding to the environment in which the vehicle is situated. Navigation module(s) 1030 may analyze obstacle data and/or other data, such as action data, to determine how to move and control the vehicle.

The vehicle control module(s) 1031 may include computer-executable instructions, code, or the like that are responsive to execution by one or more of the processor(s) 1002 may perform functions including, but not limited to, control certain aspects of the vehicle. For example, the vehicle control module(s) 1031 may control all or some movement and audio/visual presentation of the vehicle or, alternatively, may work together with navigation module to control the actions of the vehicle control.

Referring now to other illustrative components depicted as being stored in the data storage 1020, the O/S 1022 may be loaded from the data storage 1020 into the memory 1004 and may provide an interface between other application software executing on the vehicle 1000 and hardware resources of the computing device 1000. More specifically, the O/S 1022 may include a set of computer-executable instructions for managing hardware resources of the vehicle 1000 and for providing common services to other application programs (e.g., managing memory allocation among various application programs). In certain example embodiments, the O/S 1022 may control execution of the other program module(s) for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the vehicle 1000, the input/output (I/O) interface(s) 1006 may facilitate the receipt of input information by the vehicle 1000 from one or more I/O devices as well as the output of information from the vehicle 1000 to the one or more I/O devices. The I/O devices may include any of a variety of components such as various sensors for navigation as well as the light emitting assembly described herein. The I/O devices may also optionally include a display or display screen having a touch surface or touchscreen; an audio output device for producing sound, such as a speaker; an audio capture device, such as a microphone; an image and/or video capture device, such as a camera; and so forth. Any of these components may be integrated into vehicle 1000 or may be separate.

The optional I/O interface(s) 1006 may also include an interface for an external peripheral device connection such as universal serial bus (USB), FireWire, Thunderbolt, Ethernet port or other connection protocol that may connect to one or more networks. The optional I/O interface(s) 1006 may also include a connection to one or more of the antenna(e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The vehicle 1000 may further include one or more network interface(s) 1008 via which the vehicle 1000 may communicate with any of a variety of other systems, platforms, networks, devices, and so forth. The network interface(s) 1008 may enable communication, for example, with one or more servers, computing devices, one or more wireless routers, one or more host servers, one or more web servers, and the like via one or more of networks. The transceiver(s) 1012 may have the same or substantially the same features, operation, and/or functionality as described above with respect to transceiver(s) 1012.

It should be appreciated that the program module(s), applications, computer-executable instructions, code, or the like depicted in FIG. 10 as being stored in the data storage 1020, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the vehicle 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the vehicle 1000 may include alternate and/or additional hardware, software, or firmware components beyond those described or depicted without departing from the scope of the disclosure. More particularly, it should be appreciated that software, firmware, or hardware components depicted as forming part of the vehicle 1000 are merely illustrative and that some components may not be present or additional components may be provided in various embodiments. While various illustrative program module(s) have been depicted and described as software module(s) stored in data storage 1020 and/or data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    a navigation marker designed to emit a fluorescence emission; and
    a vehicle comprising:
        a light detection assembly having:
            a light emitting diode (LED) that emits ultraviolet (UV) light at a first wavelength;
            a narrowband filter, wherein a second light emitted from the navigation marker and having a second wavelength can propagate through the narrowband filter and the narrowband filter blocks the first wavelength;
            a photodiode aligned with the narrowband filter and configured to sense the second light propagating through the narrowband filter; and
            a lens positioned between and aligned with the narrowband filter and the photodiode;
        a computing device configured to:
            determine optical data based on the second light sensed by the photodiode and indicative of the second wavelength;
            determine the optical data corresponds to a first vehicle action based on the second wavelength and a database, the database comprising a first vehicle action and a second vehicle action and associating the first vehicle action with the second wavelength and the second vehicle action with a third wavelength, the vehicle action corresponding to one or more of reducing vehicle speed, increasing vehicle speed, stopping the vehicle, presenting an audible alarm, presenting a visual alarm, or wirelessly transmitting a message; and
            cause the vehicle to perform the first vehicle action, wherein the second light is emitted from the navigation marker illuminated by the first light.

2. The vehicle of claim 1, wherein the computing device is further configured to:
    communicate the first vehicle action to a navigation module adapted to control movement of the vehicle; and
    perform, by the navigation module, the first vehicle action.

3. The vehicle of claim 1, further comprising an analog-to-digital converter in electrical communication with the photodiode and the computing device, and configured to generate the optical data indicative of the second light.

4. The vehicle of claim 3, wherein the computing device is further configured to:
    determine an optical property of the optical data indicative of a first intensity value;
    determine the optical property satisfies a threshold value indicative of the second wavelength.

5. A vehicle comprising:
    a light detection assembly having:
        a light emitter configured to emit a first light at a first wavelength;
        an optical filter, wherein a second light is emitted from a navigation marker illuminated by the first light and corresponding to a second wavelength can propagate through the optical filter and the optical filter blocks the first wavelength; and
        an optical sensor aligned with the optical filter and configured to sense the second light propagating through the optical filter;
    a computing device configured to:
        determine optical data based on the second light sensed by the optical sensor, the optical data indicative of the second wavelength;
        determine the optical data corresponds to a first vehicle action based on the second wavelength and a database, the database comprising a first vehicle action and a second vehicle action and associating the first vehicle action with the second wavelength and the second vehicle action with a third wavelength; and
        cause the vehicle to perform the first vehicle action based on the optical data corresponding to the first vehicle action.

6. The vehicle of claim 5, wherein the computing device is further configured to:
    determine an optical property of the optical data indicative of a first intensity value;
    determine the optical property satisfies a threshold value indicative of the second wavelength.

7. The vehicle of claim 5, wherein the first vehicle action includes one or more of reducing vehicle speed, increasing vehicle speed, stopping the vehicle, presenting an audible alarm, presenting a visual alarm, or wirelessly transmitting a message.

8. The vehicle of claim 5, wherein the computing device is further configured to:
    communicate the first vehicle action to a navigation module adapted to control movement of the vehicle; and
    perform, by the navigation module, the first vehicle action.

9. The vehicle of claim 5, further comprising a lens positioned between and aligned with the optical sensor and the optical filter.

10. The vehicle of claim 5, wherein the light emitter is a light emitting diode (LED) that emits ultraviolet (UV) light and the optical sensor is a photodiode.

11. The vehicle of claim 5, wherein the optical filter comprises one or more coating or dopant to permit the second light through the optical filter and block the first light.

12. The vehicle of claim 5, further comprising an analog-to-digital converter in electrical communication with the optical sensor and the computing device and configured to generate the optical data.

13. The vehicle of claim 5, wherein the navigation marker is designed to emit a fluorescence emission.

14. A method comprising:
causing a light emitter to emit a first light having a first wavelength;
determining an electrical signal based on a second light filtered through an optical filter, the second light having a second wavelength and emitted from a navigation marker designed to emit a fluorescence emission, and the optical filter designed to permit the second light through the optical filter and block the first light;
determining optical data having a first intensity value of the second light;
determining the first intensity value satisfies a threshold value indicative of the second wavelength
determining the optical data corresponds to a first action based on the second wavelength and a database, the database comprising a first action and a second action and associating the first action with the second wavelength and the second action with a third wavelength; and
causing a vehicle to perform the first action,
wherein the second light is emitted from the navigation marker illuminated by the first light.

15. The method of claim 14, wherein the first action corresponds to one or more of reducing speed, increasing speed, stopping the vehicle, presenting an audible alarm, presenting a visual alarm, or wirelessly transmitting a message.

16. The method of claim 14, further comprising:
communicating the first action to a navigation module adapted to control movement of the vehicle; and
perform, by the navigation module, the first action.

17. The method of claim 14, wherein the second wavelength is within a fluorescent spectrum.

18. The method of claim 14, further comprising:
determining the optical data based on the signal using an analog-to-digital converter.

* * * * *